(12) United States Patent
Chlystek et al.

(10) Patent No.: US 8,683,970 B2
(45) Date of Patent: Apr. 1, 2014

(54) AIR INTAKE SYSTEM FOR OFF-ROAD VEHICLES

(75) Inventors: Thomas Michael Chlystek, Darien, IL (US); Kaushal Ghorpade, Chicago, IL (US); Keith James Ward, Racine, WI (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/560,717

(22) Filed: Jul. 27, 2012

(65) Prior Publication Data

US 2013/0025557 A1  Jan. 31, 2013

Related U.S. Application Data

(60) Provisional application No. 61/512,813, filed on Jul. 28, 2011.

(51) Int. Cl.
*F02M 35/08* (2006.01)

(52) U.S. Cl.
USPC ............. 123/184.21; 55/502; 55/503; 55/498

(58) Field of Classification Search
CPC ........... B01D 21/0042; B01D 2201/14; F02M 35/024; F02M 35/10013; F02M 35/04; F02M 35/08; F24F 3/1603; G01F 15/12; F01N 1/083; F01N 1/084; F04D 29/667
USPC ............. 123/184.21, 184.42, 184.47, 184.53, 123/184.55, 184.56; 55/502, 498, 503, 337, 55/346, 348, 283
See application file for complete search history.

(56) References Cited

U.S. PATENT DOCUMENTS

| | | | |
|---|---|---|---|
| 3,926,595 A | 12/1975 | Bockman | |
| 4,248,613 A | 2/1981 | Linhart | |
| 4,359,330 A | 11/1982 | Copley | |
| 5,480,464 A | 1/1996 | DeVilliers et al. | |
| 5,958,096 A * | 9/1999 | Yee et al. | 55/385.3 |
| 5,970,963 A * | 10/1999 | Nakase et al. | 123/590 |
| 6,736,238 B2 * | 5/2004 | Kerr | 181/267 |
| 6,797,024 B2 | 9/2004 | Inoue | |
| 7,174,981 B2 | 2/2007 | Sugitani et al. | |
| 7,674,308 B2 * | 3/2010 | Krisko et al. | 55/502 |
| 7,674,981 B1 | 3/2010 | Hesselbarth et al. | |
| 2003/0072459 A1* | 4/2003 | Cole et al. | 381/71.7 |
| 2007/0137152 A1 | 6/2007 | Xu et al. | |
| 2009/0113856 A1* | 5/2009 | Cooper et al. | 55/283 |
| 2011/0296806 A1* | 12/2011 | Krisko et al. | 55/337 |
| 2012/0085307 A1* | 4/2012 | Siber et al. | 123/184.21 |

FOREIGN PATENT DOCUMENTS

| | | | |
|---|---|---|---|
| JP | 2002349373 A | 12/2002 | |
| JP | 2003169744 A | 6/2003 | |

* cited by examiner

*Primary Examiner* — Noah Kamen
*Assistant Examiner* — Long T Tran
(74) *Attorney, Agent, or Firm* — Sue C. Watson

(57) ABSTRACT

An air intake system for an off-road vehicle includes an intake conduit upstream of a segmented debris removal device and a mail filter element. A baffle is disposed in the intake conduit and extends into the incoming air stream to avoid swirl in the air stream and provide more even air flow distribution into the segments of the segmented debris removal device. The baffle may have two generally parallel elements spaced from one another to reduce mixing of air regions separated by the baffle. The baffle reduces or eliminates vortices that adversely affect air flow into the segmented debris removal device.

14 Claims, 5 Drawing Sheets

AIR INTAKE SYSTEM FOR OFF-ROAD VEHICLES

CROSS REFERENCE TO RELATED APPLICATIONS

This application claims priority from and the benefit of U.S. Provisional Patent Application No. 61/512,813, entitled, "Air Intake System for Off-Road Vehicles," filed Jul. 28, 2011, which is hereby incorporated by reference in its entirety.

BACKGROUND

The invention relates generally to air intake system for internal combustion engines, and more particularly to an intake system that permits enhanced efficiency capable of meeting stringent demands of reduced emissions standards.

Many off-road vehicles are known for various applications that demand considerable power output and high reliability. Construction and agricultural applications, for example, make use of trucks, tractors, combines, and specialized vehicles of numerous configurations, many utilizing powerful diesel engines as their primary power plant. Historically, these vehicles have emphasized power and reliability first and foremost, with issues such as fuel consumption and emissions being important, but somewhat secondary. Increasingly, however, ever more stringent requirements are being placed on these vehicles to reduce fuel consumption and emissions, while still providing the power output needed for their particular applications.

One standard currently requiring significant redesign in such vehicles is the Tier 4 emission regulations being implemented by the U.S. Environmental Protection Agency. These regulations provide guidance for off-road diesel engines, and affect certain higher horsepower engine ratings. They call for significant reductions in particulate matter (smoke), as well as in oxides of nitrogen. Some adaptations contemplated to address these standards include selective catalytic reduction, in which engine exhausts passes through a catalytic chamber where it is sprayed with a non-toxic mixture of chemical urea and purified water. When the mixture combines with hot exhaust in the catalytic chamber, it is broken down into water vapor and nitrogen. Advantages of such systems include longer service intervals, lower fuel consumption, and wider fuel compatibility.

These and other approaches to still must satisfy considerable air intake demands of the engines, and must provide a high degree of inlet filtration. This is particularly true for vehicles operating in challenging environments, such as construction and farming, in which dirt and dust may be present in relatively high concentrations. Current designs may not be suitable for these more demanding applications, or may operate as unacceptably low levels of efficiency.

There is a need, therefore, for improved air intake systems for off-road vehicles.

BRIEF DESCRIPTION

The present invention provides novel improvements to air intake systems designed to respond to such needs. In accordance with certain aspects, the air intake systems make use of one or more baffles that direct inlet air flow in ways that avoid creation of vortices that may adversely affect entry of air into segments of a segmented debris removal device.

In accordance with certain aspects of the disclosure, an air intake system is provided for off-road vehicles that includes a filter element, a segmented debris removal assembly upstream of the filter element, and a conduit upstream of the segmented debris removal assembly. A baffle is disposed in the conduit and configured to reduce swirl of an incoming air stream to substantially uniformly introduce the air stream into segments of the segmented debris removal assembly.

In accordance with a particular embodiment disclosed, an air intake system for off-road vehicles comprises a filter element, a segmented debris removal assembly upstream of the filter element, and a conduit upstream of the segmented debris removal assembly. A baffle is disposed in the conduit and has first and second baffle elements spaced from one another and extending in a direction generally transverse to a direction of an incoming air stream to reduce swirl of an incoming air stream to substantially uniformly introduce the air stream into segments of the segmented debris removal assembly.

In accordance with still further aspects, an air intake system for off-road vehicles comprises a baffle configured to be disposed in a vehicle air intake conduit and having first and second baffle elements of different lengths. The baffle elements are spaced from one another and extend in a direction generally transverse to a direction of an incoming air stream to reduce swirl of an incoming air stream to substantially uniformly introduce the air stream into segments of a segmented debris removal assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
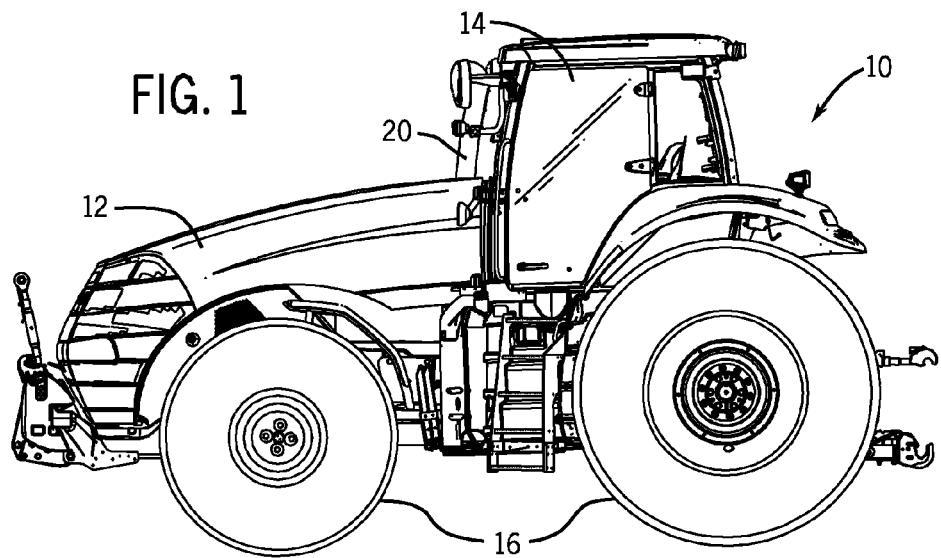
FIG. 1 is a perspective view of an exemplary work vehicle incorporating an air intake system in accordance with the present disclosure.

FIG. 1 illustrates an exemplary off-road or work vehicle 10 of a type that may utilize an intake system as set forth in the present disclosure. In this case, the vehicle is an agricultural tractor. However, it should be borne in mind that any suitable off-road vehicle may utilize aspects of the invention described herein, including combines, trucks, work and pleasure vehicles, and so forth. In the illustrated embodiment the vehicle 10 includes a body 12 and a cabin 14 in which an operator would sit or stand to operate the vehicle. The body may be any conventional type, housing a power plant, such as an internal combustion engine, a transmission, and a power train (not separately shown) for driving one or more wheels 16. It should be understood that in some vehicles such wheels may be replaced with tracks or other drive systems. The vehicle includes an air intake 18 to provide fresh air for operation of the engine. As in other vehicles, fuel and air mixtures are combusted to drive the vehicle and exhausts may exit through an exhaust system 20.

Figure 2:
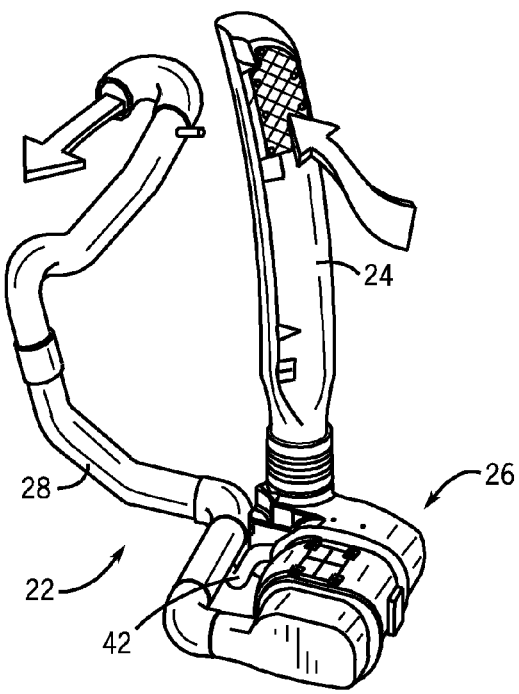
FIG. 2 is perspective view of assembled components of an exemplary air intake system in accordance with the disclosure.

FIG. 2 illustrates certain of the components that may be included in an exemplary intake system 22 for use in a vehicle of the type shown in FIG. 1. The intake system may include, for example, intake tubing 24 that draws air through an opening or grill as illustrated, and introduces the air into a filter assembly 26. The filter assembly may include a range of internal components for eliminating particulate matter and debris, for filtering finer matter, such as dust from the air, and for advancing the air to outlet tubing 28. The outlet tubing may route the air around various components of the vehicle, as illustrated, and ultimately introduces the air into an intake manifold where it may be combined with fuel.

Figure 3:
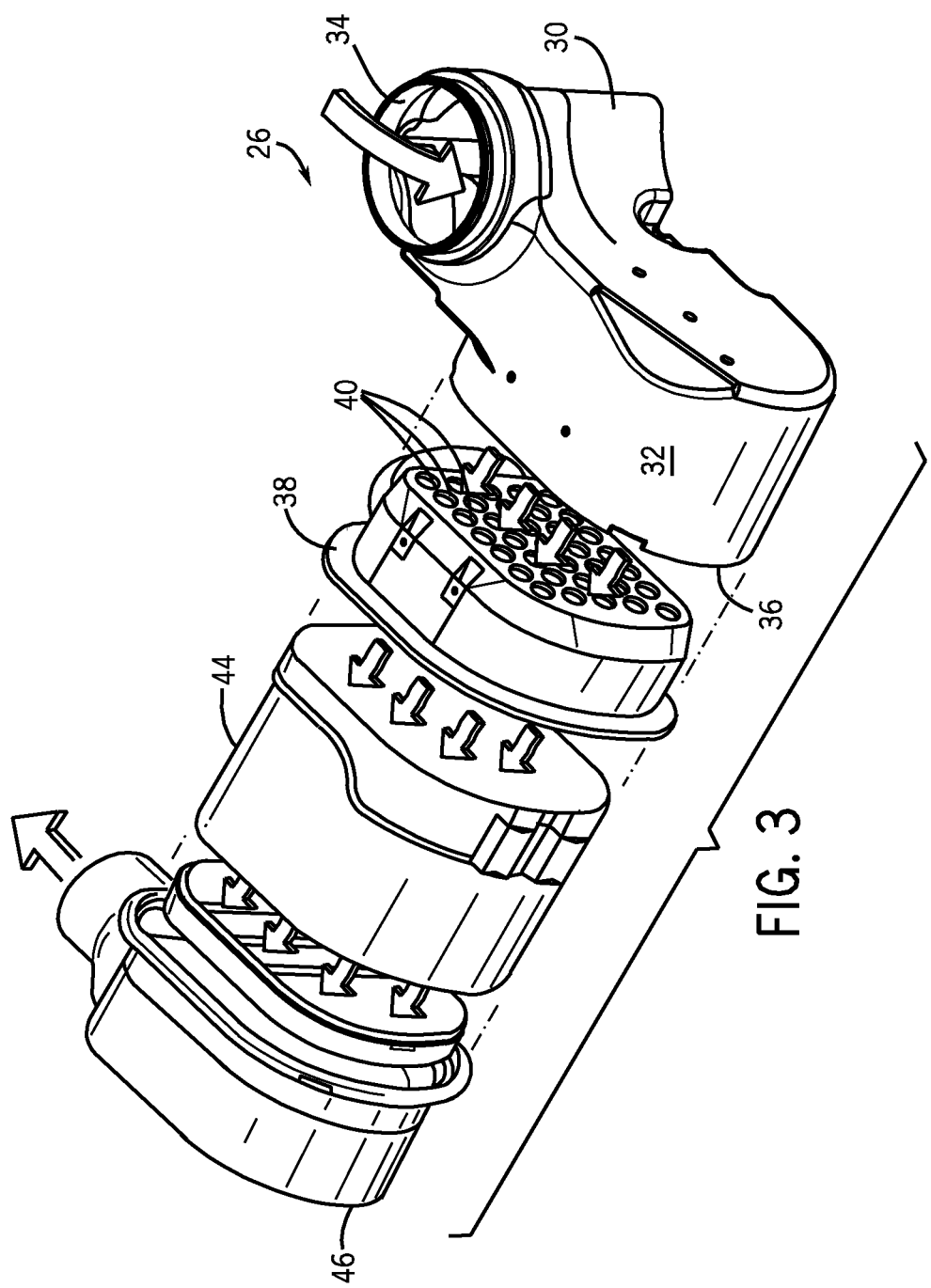
FIG. 3 is an exploded perspective view of certain of the components of the air intake system of FIG. 2.

FIG. 3 illustrates the various components of the filter assembly shown in FIG. 2, but in somewhat greater detail and exploded to illustrate the flow of air through these components. In particular, FIG. 3 illustrates an inlet conduit 30 comprising a housing 32 that receives air through an opening 34. In the illustrated embodiment, the opening 34 will be in fluid communication with the interior of the intake tubing 24 shown in FIG. 2. The inlet conduit 30 serves to channel the pre-filtered air to a series of debris separating and filtering components as illustrated. In particular, a partitioned debris separator 38 is provided that fits at least partially within the housing 32. This debris separator may utilize any one of a number of technologies to eliminate larger debris from the air. In the illustrated embodiment, the separator 38 is partitioned into a number of inlets 40, each of which may be provided with a separating device of a type generally known in the art, such as devices that create a spinning or centrifugal motion in the air to separate particulate matter and debris from the air. The particulate matter and debris separated by the separator 38 may be discharged through a conduit 42 (see FIG. 2). The inlet conduit 30 and interior parts of the inlet conduit are designed to provide relatively even distribution of the air to the inlets 40 of the partitioned debris separator 38 as described more fully below. The assembly of FIG. 3 further includes a primary filter 44 downstream of the partitioned debris separator, along with a secondary filter 46. These filters serve to further filter very small dust and other particles from the air, which is sufficiently clean as it exits the secondary filter 46 for combination with fuel for combustion.

It has been determined that, depending upon such factors as the size, shape, volume, and air flow through the inlet conduit, the air within housing 32 may swirl in patterns that are detrimental to the operation of the filter components, and particularly the partitioned debris separator. That is, swirls may develop within the housing, as discussed in greater detail below, that do not offer adequate flow to certain of the inlets 40 of the partitioned debris separator 38. Accordingly, it has been found that vortices that may develop within the housing may channel air in such a manner as to avoid effective separation of debris in the partitioned debris separator 38. Such debris may not be separated from the air in the partitioned debris separator, but flow directly through the separator to one or more areas of the primary filter 44. This can lead to inefficient operation of the filtering components, and very decline in the effectiveness of the primary filter. This debris, if the separator operates properly, would largely be removed from the air prior to impacting the primary filter.

Figure 4:
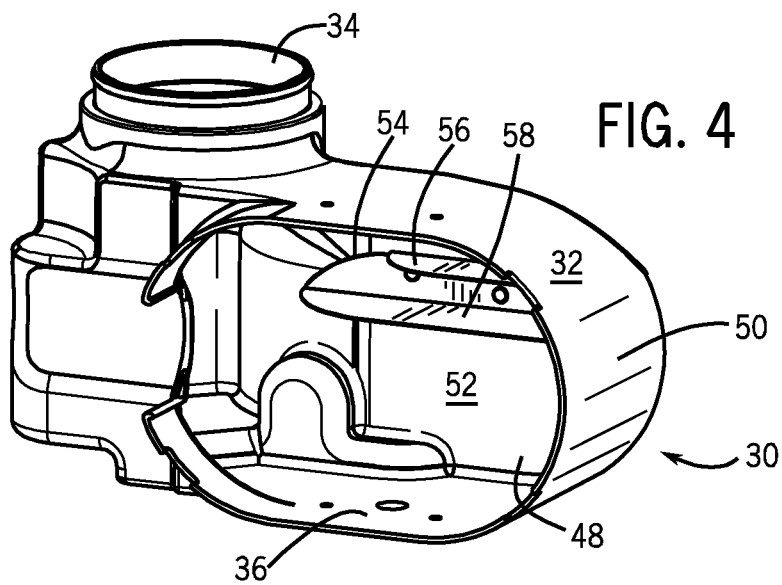
FIGS. 4 and 5 are perspective views of an exemplary intake conduit employing a baffle in accordance with the disclosure.
Figure 5:
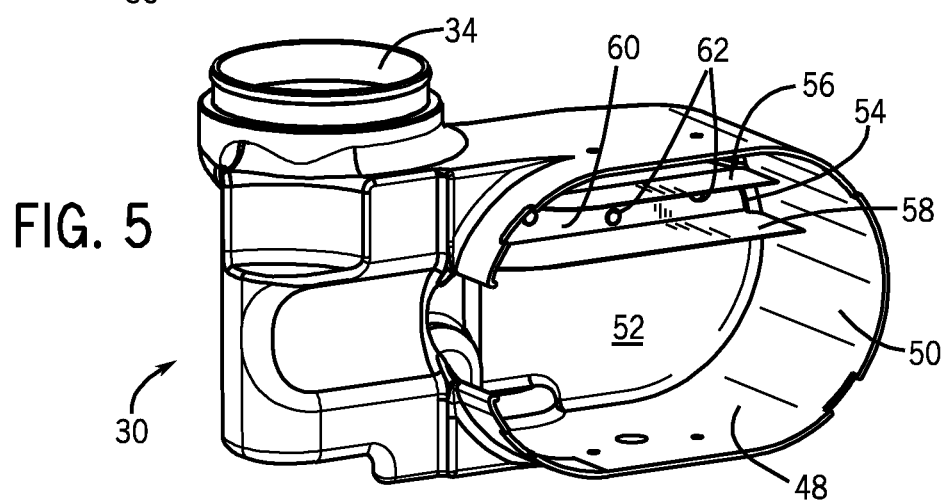

To avoid these consequences of unwanted air circulating patterns in the housing 32, a baffle is provided within the housing as illustrated in FIGS. 4 and 5. As shown in the figures, the housing 32 has an interior volume 48 defined by a sidewall 50 and a rear wall 52. While this interior volume 48 will be occupied at least partially by the partitioned debris separator 38, a rear portion of the housing will allow for distribution of air from the inlet 34 to the outlet 36 for introduction into the partitioned debris separator. To avoid or reduce unwanted circulating patterns of the air within the housing, a baffle 54 is provided that extends into the incoming air stream. In the illustrated embodiment, the baffle 54 comprises an upper plate 56 and a lower plate 58. While any suitable configuration and implementation of the baffle may be employed, in the embodiment illustrated in FIGS. 4 and 5, the baffle comprises a bent metal component having a rear web 60 between the upper and lower plates 56 and 58. Apertures 62 are formed in this web to allow the web to be secured to the rear wall 52 of the inlet conduit.

Figure 6:
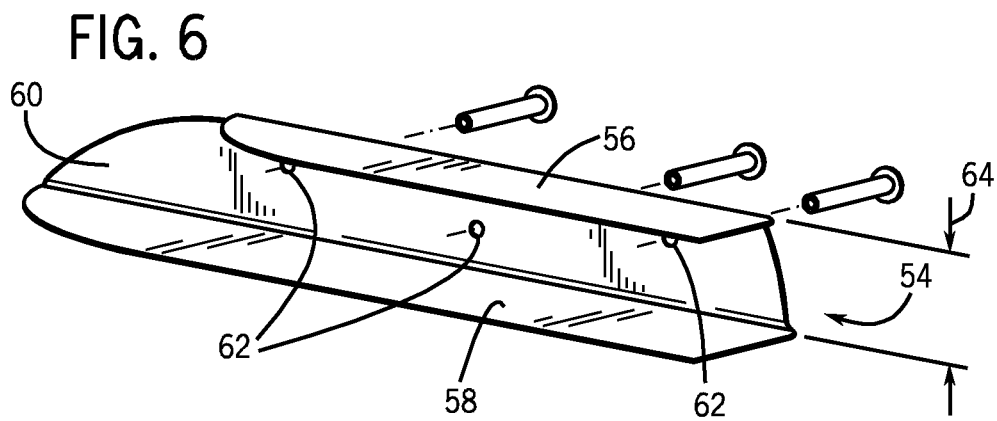
FIG. 6 is a perspective view of the baffle illustrated in FIGS. 4 and 5.

The baffle alone is illustrated in FIG. 6. As mentioned, in the illustrated embodiment the baffle 54 comprises an upper plate 56 and a lower plate 58 with a web 60 extending between these plates. The apertures 62 are provided for receiving fasteners as illustrated in FIG. 6, which may take the form of screws, bolts, rivets, or any suitable fasteners. Indeed, any system or method may be employed for securing the baffle into the housing, and where desired the baffle may not be a separate piece, but may be molded directly into the housing. As best illustrated in FIG. 5, one end of the baffle, when provided as a separate element, is contoured to fit snuggly against the sidewall 50 of the housing. In opposite end of the baffle provides for extension of the upper and lower plates to different degrees to effectively separate the incoming air stream. That is, in the presently contemplated embodiment illustrated, upper plate 56 is shorter than lower plate 58, and the two plates are separated by a distance or space 64 by the form of the web 60. The space 64 and relative links of the upper plate 56 and lower plate 58 allow for interruption of re-mixing of separated air streams above and below the baffle. Other forms of baffles may, of course, be employed, but it has been found that the form illustrated in FIG. 6 provides excellent separation of air streams to avoid vortices developing that an adversely affect the performance of the downstream air separator.

Figure 7:
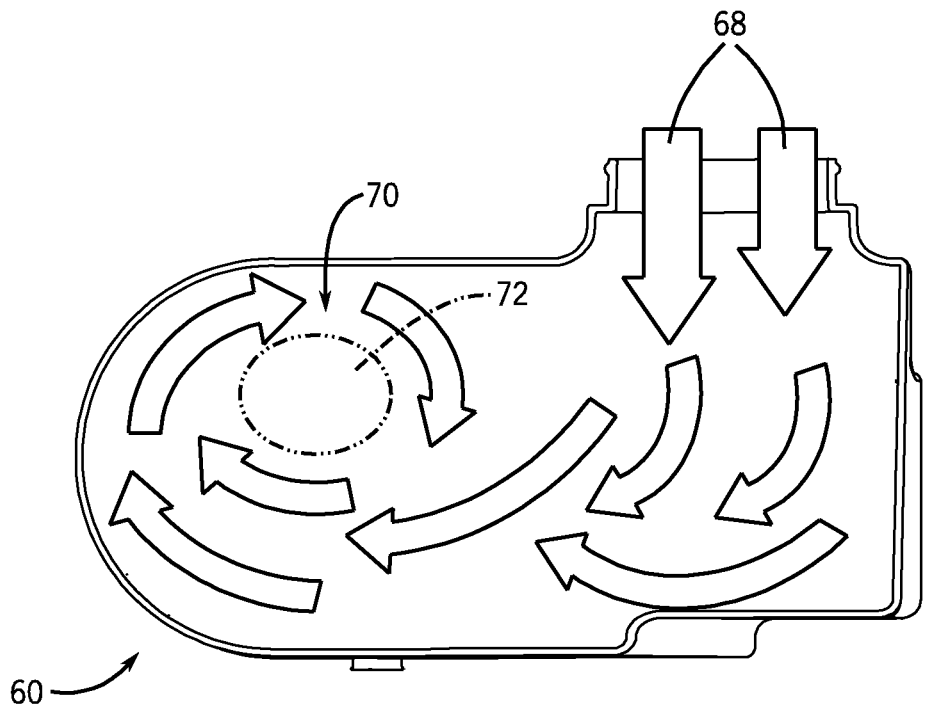
FIG. 7 is an air flow diagram illustrating typical air flow within the intake conduit without a baffle.
Figure 8:
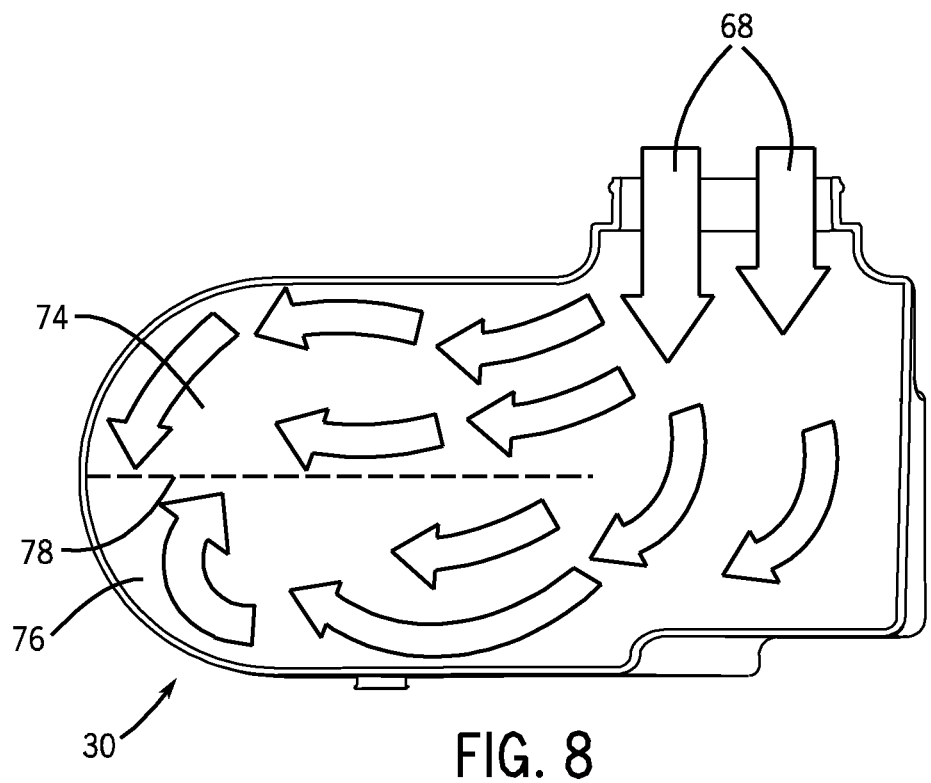
FIG. 8 is a similar diagram illustrating flow of air within the intake conduit with a baffle.

FIGS. 7 and 8 illustrate air flow within the housing without and with the baffle described above. In particular, in simulations, a housing without a baffle, indicated by reference numeral 66, allows for air streams, indicated by arrows 68, to develop a vortex-type of flow pattern as indicated generally by reference numeral 70. This pattern may cause circulation of the air within the housing, leading to a center 72 which essentially comprises dead space through which little or no air flows. The absence of such flow in this region allows for debris to be introduced directly to the primary filter described above due to the design and operation of the air separator. On the other hand, in the illustration of FIG. 8, inlet conduit 30 with a baffle exhibits very different flow patterns. That is, the air flow 68 is effectively partitioned into an upper region 74 and a lower region 76. A clear line of demarcation 78 can be seen in simulations and no similar vortex to that shown in FIG. 7 develops. This arrangement also prohibits significant mixing of the air introduced into the upper and lower regions, so air is more evenly provided to the separator inlets.

Figure 9:
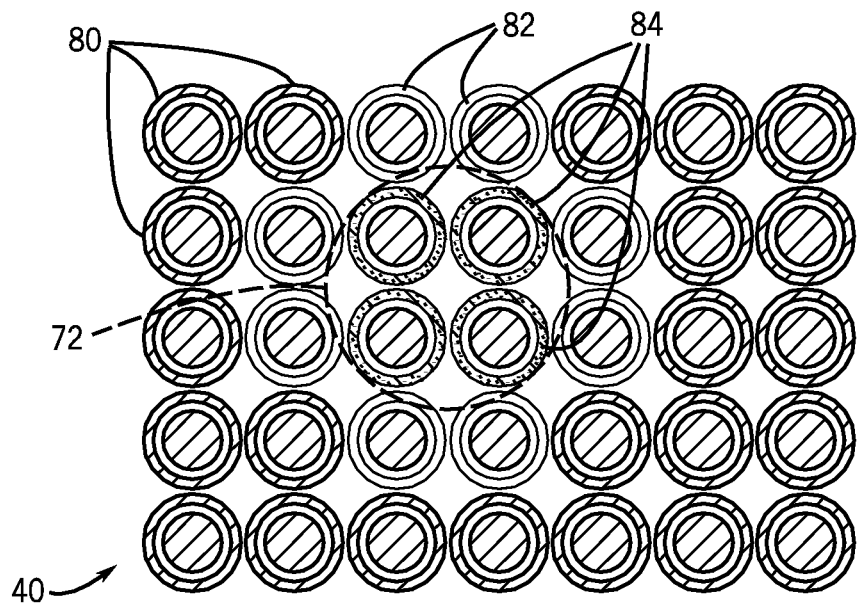
FIG. 9 is an illustration of partitioned debris intakes illustrating air supply patterns in the case of an intake conduit without a baffle.
Figure 10:
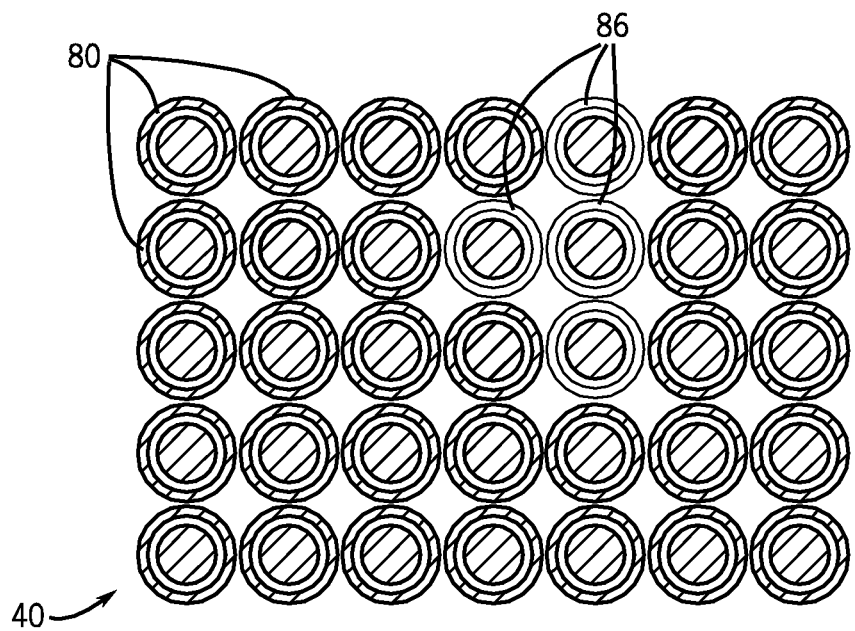
FIG. 10 is a similar diagram illustrating altered supply to the partitioned debris separator with a baffle.

FIGS. 9 and 10 illustrate an exemplary array of separator inlets with and without baffle described above. In simulations, the inlets exhibit very different air flow characteristics. That is, certain inlets 80 receive adequate air flow for operation of the centrifugal devices used to separate particulate matter from the air. Other inlets 82 receives less flow but may generally operate sufficiently. In the region of the vortex 72, however, a number of inlets 84 experience little or no inlet air introduction, allowing for blowing of particulate matter through these directly to the primary filter. As illustrated in FIG. 10, however, with the baffle all inlets receive more uniform flow, with some inlets receiving substantially the same flow as in the case of FIG. 9, as indicated by reference numeral 80, and some inlets receiving somewhat less flow as indicated by reference numeral 86, but which is nevertheless sufficient for separation of particulate matter as described above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An air intake system for off-road vehicles, comprising: a filter element; a segmented debris removal assembly upstream of the filter element; a conduit upstream of the segmented debris removal assembly; and a baffle disposed in the conduit and configured to reduce swirl of an incoming air stream to substantially uniformly introduce the air stream into segments of the segmented debris removal assembly, the baffle including first and second generally parallel baffle elements extending into the incoming air stream, the first baffle element positioned to extend farther into the incoming air stream than the second baffle element.

2. The air intake system of claim 1, wherein the baffle divides the incoming air stream in two substantially separated regions upstream of the segmented debris removal assembly.

3. The air intake system of claim 1, wherein the baffle is secured to an interior wall of the conduit.

4. The air intake system of claim 1, wherein the baffle elements are spaced from one another to reduce remixing of regions of the incoming air stream separated by the baffle elements.

5. An air intake system for off-road vehicles, comprising: a filter element; a segmented debris removal assembly upstream of the filter element; a conduit upstream of the segmented debris removal assembly; and a baffle disposed in the conduit and configured to reduce swirl of an incoming air stream to substantially uniformly introduce the air stream into segments of the segmented debris removal assembly, wherein the baffle comprises first and second generally parallel baffle elements extending into the incoming air stream, wherein the first and second baffle elements are joined to one another by a web, and wherein the first and second baffle elements and the web comprise a single piece of bent metal.

6. The air intake system of claim 5, wherein the baffle is mounted in the conduit by attachment of the web to an interior wall of the conduit.

7. An air intake system for off-road vehicles, comprising: a filter element; a segmented debris removal assembly upstream of the filter element; a conduit upstream of the segmented debris removal assembly; and a baffle disposed in the conduit and having first and second baffle elements spaced from one another and extending in a direction generally transverse to a direction of an incoming air stream to reduce swirl of an incoming air stream to substantially uniformly introduce the air stream into segments of the segmented debris removal assembly, the first baffle element positioned to extend farther into the incoming air stream than the second baffle element.

8. The air intake system of claim 7, wherein the baffle divides the incoming air stream in two substantially separated regions upstream of the segmented debris removal assembly.

9. The air intake system of claim 7, wherein the baffle elements are spaced from one another to reduce remixing of regions of the incoming air stream separated by the baffle elements.

10. An air intake system for off-road vehicles, comprising: a filter element; a segmented debris removal assembly upstream of the filter element; a conduit upstream of the segmented debris removal assembly; and a baffle disposed in the conduit and having first and second baffle elements spaced from one another and extending in a direction generally transverse to a direction of an incoming air stream to reduce swirl of an incoming air stream to substantially uniformly introduce the air stream into segments of the segmented debris removal assembly, wherein the first and second baffle elements are joined to one another by a web, and wherein the first and second baffle elements and the web comprise a single piece of bent metal.

11. The air intake system of claim 10, wherein the baffle is mounted in the conduit by attachment of the web to an interior wall of the conduit.

12. An air intake system for off-road vehicles, comprising: a baffle configured to be disposed in a vehicle air intake conduit and having first and second baffle elements of different lengths, spaced from one another and extending in a direction generally transverse to a direction of an incoming air stream to reduce swirl of an incoming air stream to substantially uniformly introduce the air stream into segments of a segmented debris removal assembly, wherein the first baffle element is disposed to be upstream of the second baffle element when the baffle is placed in the vehicle air intake, and wherein the first baffle element extends farther into the incoming air stream than the second baffle element.

13. The air intake system of claim 12, wherein the first and second baffle elements are coupled to one another by a web, and wherein the baffle elements and the web comprise a single piece of bent metal.

14. The air intake system of claim 13, wherein the web comprises apertures to receive fasteners for mounting the baffle in the vehicle air intake conduit by attachment of the web to an interior wall of the conduit.

* * * * *